United States Patent [19]
Newlin

[11] Patent Number: 5,815,381
[45] Date of Patent: Sep. 29, 1998

[54] SINGLE-BARRIER CLOSED LOOP DC-TO-DC CONVERTER AND METHOD

[75] Inventor: Trevor M. Newlin, Livingston, Scotland

[73] Assignee: Burr-Brown Corporation, Tucson, Ariz.

[21] Appl. No.: 870,211

[22] Filed: Jun. 6, 1997

[51] Int. Cl.⁶ ............................................. H02M 3/335
[52] U.S. Cl. .............................. 363/17; 363/26; 363/41; 363/98; 363/132
[58] Field of Search .................................. 363/15, 16, 17, 363/20, 21, 24–26, 41, 58, 95–98, 131, 132; 323/266, 282, 283, 285

[56] References Cited

U.S. PATENT DOCUMENTS

| | | | |
|---|---|---|---|
| 3,764,881 | 10/1973 | Thomas | 321/2 |
| 4,146,832 | 3/1979 | McConnell | 323/17 |
| 4,301,497 | 11/1981 | Johari | 363/21 |
| 4,316,242 | 2/1982 | Colangelo et al. | 363/21 |
| 4,809,150 | 2/1989 | Limuti et al. | 363/21 |
| 4,835,454 | 5/1989 | White | 323/222 |
| 4,888,821 | 12/1989 | Hamp et al. | 363/21 |
| 4,920,471 | 4/1990 | Livingston et al. | 363/22 |
| 4,996,638 | 2/1991 | Orr | 363/21 |
| 5,008,794 | 4/1991 | Leman | 363/21 |
| 5,060,131 | 10/1991 | Sikora | 363/97 |
| 5,091,837 | 2/1992 | Duspiva et al. | 363/15 |
| 5,138,543 | 8/1992 | Harm et al. | 363/21 |
| 5,237,606 | 8/1993 | Ziermann | 379/413 |
| 5,264,782 | 11/1993 | Newton | 323/288 |
| 5,390,101 | 2/1995 | Brown | 363/20 |
| 5,392,206 | 2/1995 | Peterson et al. | 363/19 |
| 5,485,361 | 1/1996 | Sokal | 363/21 |
| 5,510,779 | 4/1996 | Maltby et al. | 340/870.3 |
| 5,532,913 | 7/1996 | Suzuki et al. | 363/25 |
| 5,570,276 | 10/1996 | Cuk et al. | 363/16 |
| 5,576,941 | 11/1996 | Hguyen et al. | 363/21 |
| 5,594,324 | 1/1997 | Canter et al. | 323/282 |
| 5,703,765 | 12/1997 | Preis | 363/21 |
| 5,740,025 | 4/1998 | Siegling, III et al. | 363/65 |

*Primary Examiner*—Adolf Berhane
*Attorney, Agent, or Firm*—Cahill, Sutton & Thomas P.L.C.

[57] ABSTRACT

A DC to DC converter repeatedly divides a first digital signal (26) into 8 time frames, and repeatedly generates a second digital signal ($V_S$) during one of the 8 time frames. A DC input signal ($V_{IN}$) is converted to a pulse width modulated signal (PWM) representative of the DC input signal, which is amplified and applied across a primary winding (4A) of an isolation transformer (4) during the one time frame. A second pulse width modulated signal produced across a secondary winding (4B) of the isolation transformer is rectified to produce a DC output voltage, which is compared to a reference voltage to produce a error signal. The error signal is transmitted across the isolation transformer during the one time frame and is used to adjust the pulse width modulating, to thereby regulate the DC output voltage.

22 Claims, 4 Drawing Sheets

5,815,381

SINGLE-BARRIER CLOSED LOOP DC-TO-DC CONVERTER AND METHOD

BACKGROUND OF THE INVENTION

The invention relates to improved DC-to-DC converters, and particularly to feedback techniques therein to maintain regulation of the output DC voltage for various load and input conditions and to improve power supply transient immunity and load transient voltage immunity, and more particularly to such a DC-to-DC converter which can be packaged in a JEDEC dual-in-line (DIP) package.

There are known circuits/techniques for using a single isolation transformer in an isolation amplifier in which input data is transmitted from an input circuit across a single isolation transformer to an output circuit, and wherein the same isolation transformer is used to transmit data from the output circuit back to the input circuit. However, in the known circuits this is accomplished during a flyback pulse period. This prior technique is only suitable for low frequency operation. It suffers not only from its slowness, but also from the fact that the isolation transformer is large in size and also because the isolation transformer is costly. The prior technique described above could not possibly be used to produce a high performance DC-to-DC converter that could be packaged in a standard JEDEC integrated circuit package. Furthermore, the transformers have been unacceptably expensive. Capacitive feedback from the output portion of the secondary circuit output signal to the isolated primary circuit has been used, but does not provide the good transient immunity or high isolation voltage, both of which are very desirable for a DC-to-DC converter.

Standard PWM (pulse width modulation) configurations for isolated DC-to-DC converters, such as those using feed-forward design and those using flyback periods for feedback, drive current pulses only of one polarity into the primary winding of the transformer. Consequently, there necessarily is a non-zero average current or "standing current" which results in a corresponding "standing" flux in the core of the transformer. Such non-zero standing flux necessitates design of the core with a large enough cross-sectional area to "handle" the standing flux, resulting in a larger than desirable core size.

One product using transformer isolation, the DCP01 recently marketed by the present assignee, provides a one watt DC-to-DC converter packaged in a standard JEDEC package; however, that product does not produce a regulated DC output voltage.

Other techniques are known for providing a feedback path from the isolated output of a DC-to-DC converter to an isolated input controller circuit thereof to regulate the output voltage, including use of optical isolator circuits, but these have limited bandwidth and nonlinear performance, resulting in undesirably limited performance and high costs.

Thus, all of the known approaches to produce precise, low-loss DC-to-DC conversion require an additional inductor or large magnetic components, either of which prevents packaging of the converter in a standard JEDEC package, and there remains an unmet need for an inexpensive, accurate, well regulated high power DC-to-DC converter which can be housed in a standard JEDEC 24 pin DIP (dual-in-line package), and which is capable of supplying high power (for example, three watts) to a load.

SUMMARY OF THE INVENTION

Accordingly, it is an object of the invention to provide an improved, economical DC-to-DC converter having high transient immunity and high isolation voltage ratings and which can be readily packaged in a standard JEDEC package.

It is another object of the invention to provide an improved, economical circuit and technique for providing feedback from the output of the DC-to-DC converter to the isolated primary controller circuit thereof.

Briefly described, and in accordance with one embodiment thereof, the invention provides a system and method for performing a DC to DC conversion by generating a ramp signal (24A) having a first frequency, repeatedly dividing the ramp signal to produce a first digital signal (25A), comparing the ramp signal to a feedback error reference voltage (22A) to produce a pulse width modulation (PWM) signal (21A), applying the PWM signal to a primary winding of an isolation transformer for a predetermined number of cycles of the first digital signal, rectifying and filtering corresponding PWM signals produced by the secondary winding of the transformer to produce a DC output voltage ($V_{DCOUT}$), coupling the DC output voltage to a reference to generate an error voltage (57A), inhibiting the PWM signal from being applied to the primary winding for one cycle of the first digital signal, detecting the absence of a corresponding PWM signal produced by the secondary winding during the one cycle of the first digital signal to generate a feedback control signal (68A), transmitting the error signal (57A) across the isolation transformer as a feedback error signal during the one cycle, and sampling and storing a value of the feedback error signal as the feedback error reference voltage (22A).

DETAILED DESCRIPTION OF THE PREFERRED EMBODIMENTS

Figure 1:
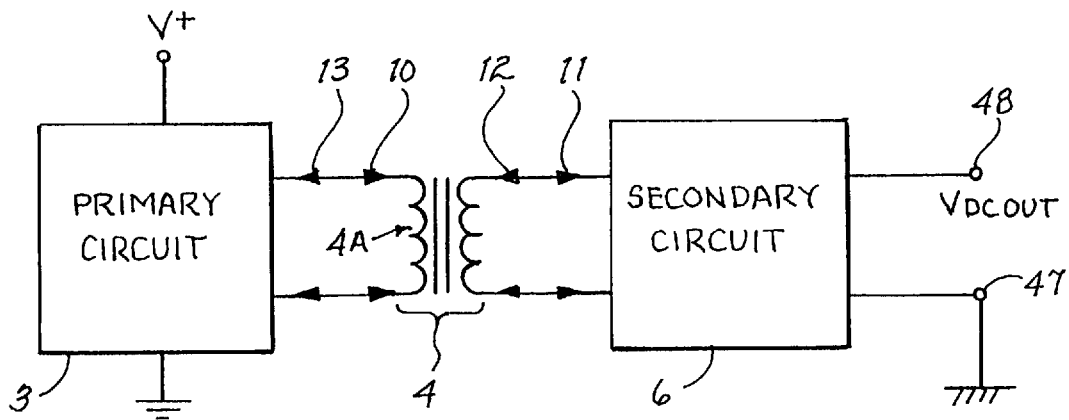
FIG. 1 is a simplified block diagram of the DC-to-DC converter of the present invention.

Referring to FIG. 1, DC-to-DC converter 1 includes a primary circuit 3 connected between an unregulated supply voltage V+ and a primary ground conductor. Primary circuit 3 produces pulse width modulation (PWM) signals on the two terminals of a primary winding 4A of an isolation transformer. In accordance with the present invention, isolation transformer 4 is the only isolation barrier between primary circuit 3, and a secondary circuit 6 is connected to the two terminals of the secondary winding of isolation transformer 4. Secondary circuit 6 produces a DC output voltage $V_{DCOUT}$ between its output terminal 48 and a secondary ground conductor 47. The DC output terminal 48 is sufficiently effectively isolated from the unregulated supply voltage V+ that if a common mode transient voltage (caused for example, by an electrostatic discharge) appears on V+, essentially none of the common mode transient voltage appears on DC output terminal 48.

According to the present invention, the single isolation transformer 4 provides transfer of both PWM power (indicated by numerals 10 and 11) from primary circuit 3 to secondary circuit 6 and feedback error information (indicated by arrows 12 and 13) from secondary circuit 6 to primary circuit 3. This enables primary circuit 3 to modulate the width of PWM power pulses 10,11 as needed to regulate the DC output voltage $V_{DCOUT}$ to a desired reference voltage despite wide variations (for example, from 32 to 75 volts) in V+.

To accomplish these functions, a time division technique is used to transmit the PWM power pulses 10,11 of FIG. 1 (into which the DC unregulated supply voltage V+ is converted by primary circuit 3) across isolation transformer 4 during a suitable number of consecutive "power periods", followed by an error "feedback period" during which power pulses are inhibited from being applied to the primary winding 4A of the transformer 4. During the feedback period a gap detection circuit in the secondary circuit 6 detects the absence of any power pulses on the secondary winding terminals and produces an error feedback enable signal that switches a DC output error signal as an error feedback pulse 12 to the secondary winding. The DC output error signal represents the amount by which the DC output voltage is lower than a desired reference voltage. The isolation transformer produces a corresponding error feedback pulse 13 on its primary winding. That pulse is sampled and held as a fed back DC error output voltage which is used to modulate the widths of the PWM power pulses 10,11 so as to increase $V_{DCOUT}$ to the desired level.

Figure 2:
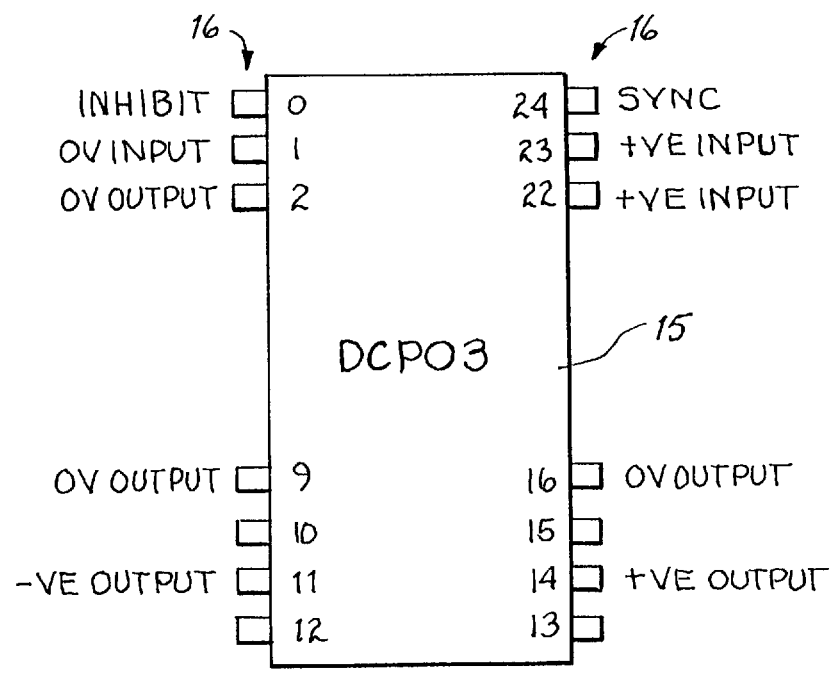
FIG. 2 is a plan view diagram of a standard 24 pin JEDEC package containing the DC-to-DC converter of FIG. 1.
Figure 2A:
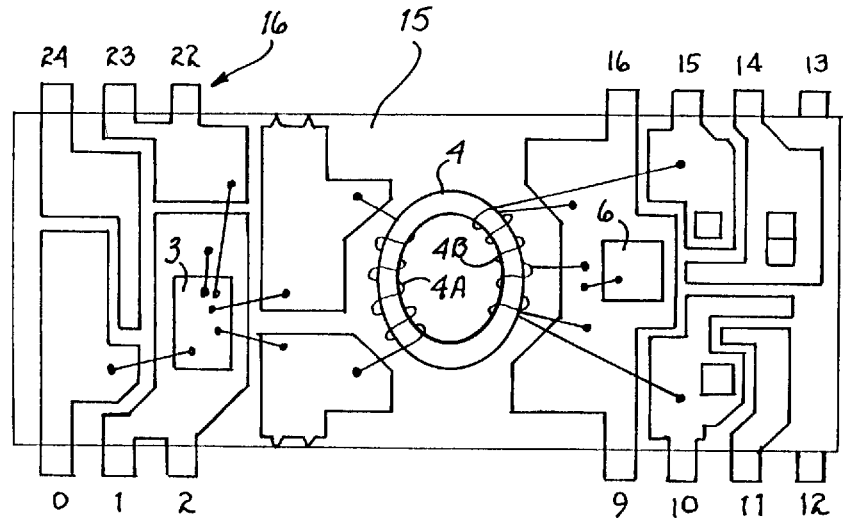
FIG. 2A is a diagram illustrating the layout of the internal lead frame, primary circuit, transformer, and secondary circuit of the DC-to-DC converter of FIGS. 1 and 2.

Referring to FIGS. 2 and 2A, the DC-to-DC converter including primary controller circuit 3, toroidal transformer 4, secondary circuit 6, and associated rectifier diodes, is packaged within the body 15 of a conventional JEDEC 24 pin DIP (dual-in-line) package. For convenience, the pin (i.e., lead) numbers have been identified in FIG. 2. In FIG. 2A the outline of the lead frame has been superimposed on the body 15 of the 24 pin package. Toroidal transformer 4 is mounted between the surrounding lead frame members as shown and held precisely in the correct position prior to encapsulation. The transformer winding wires are welded to the lead frame members as shown.

A thin, soft buffer coating composed of polyimide or other suitable material is provided over the entire toroidal transformer 4 to prevent the undesirable effects of magnetoconstriction. This also improves the isolation voltage between the core and the windings, as does providing the primary and secondary windings on separate halves of the core as shown so that they do not overlap, and also provides low capacitance coupling between the primary and secondary windings. The illustrated lead frame members immediately surrounding toroidal transformer 4 effectively spread the dissipated heat throughout the package, and provide the additional benefit of thermally linking transformer 4 to primary circuit 3. This contributes to effective activation of thermal shutdown circuitry 65 of FIG. 3 as subsequently explained.

Figure 3:
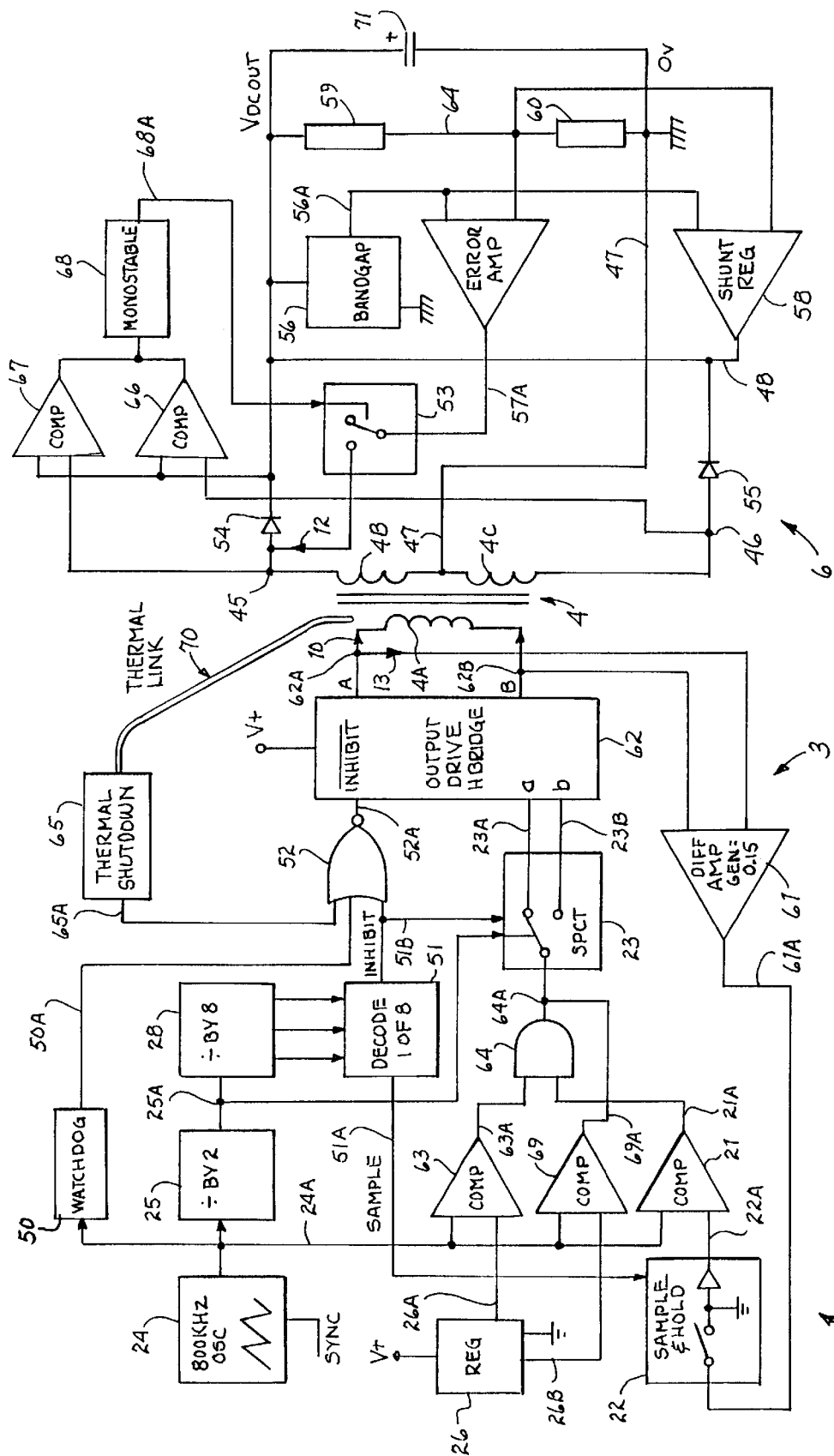
FIG. 3 is a detailed block diagram of the circuitry in the DC-to-DC converter of FIG. 1.
Figure 4:
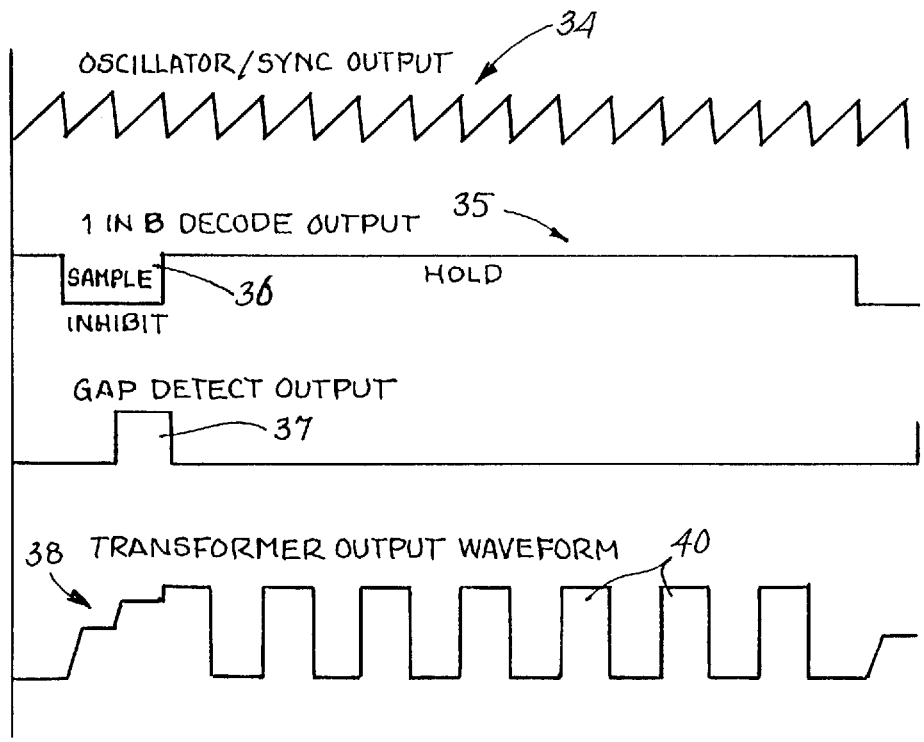
FIG. 4 is a timing diagram useful in describing the operation of the DC-to-DC converter as shown in FIG. 3.

Referring to FIG. 3, primary circuit 3 includes an oscillator circuit 24 which produces an 800 kilohertz sawtooth waveform 34 of FIG. 4 on conductor 24A. (The frequency of operation of the primary controller circuit 3 was selected to be high enough to allow sufficient power to be transferred across the thin toroidal transformer 4.) Conductor 24A is connected to inputs of a "watchdog" circuit 50, a divide-by-two circuit 25 that produces a 400 kilohertz square wave output signal on conductor 25A, and also applies the sawtooth waveform 34 to one input of each of comparators 21, 63, and 69. (The structure and function of watchdog circuit 50 is set forth in my commonly assigned pending patent application entitled "DC-AC CONVERTER PROTECTION", Ser. No. 08/665,260, filed on Jun. 17, 1996, incorporated herein by reference. Another commonly assigned pending application entitled "OSCILLATOR CIRCUIT SYNCHRONIZATION", Ser. No. 08/664,402, filed Jun. 17, 1996 by the present inventor also is incorporated herein by reference, and discloses an external synchronization conductor coupled to the output of oscillator 24 which allows a number of DC-to-DC converters to be connected in parallel, to thereby reduce variations in the magnetic fields by the various parallel-connected converters.)

The 400 kilohertz square wave on conductor 25A is applied to both the input of a divide-by-eight circuit 28 and to the control input of a single pole, double throw switch circuit 23. The three outputs of divide-by-eight circuit 28 are applied to the inputs to 1-of-8 decoder 51, which produces a waveform 35 (FIG. 4) on conductor 51B as an inhibit input to a conventional H-bridge circuit 62 and a "sample" input on conductor 51A to a sample and hold circuit 22.

Inhibit conductor 51B is coupled to an inhibit input of single pole, double throw switch circuit 23 and also to the inhibit input of H-bridge circuit 62 by a NOR circuit 52. (Note that the logic diagram of FIG. 3 does not correspond exactly to the actual circuitry used. For example, the function of NOR gate 52 in FIG. 3 actually is accomplished by a "wired OR" connection.) H-bridge circuit 62 also includes a power supply input to which the unregulated supply voltage V+ is applied, two inputs "a" and "b" to which the PWM signal on conductor 64A is alternatively applied, and outputs A and B which supply PWM voltage pulses (of amplitude V+) to the terminals 62A and 62B of primary winding 4A.

Double pole, double throw switch circuit 23 alternately switches consecutive PWM pulses on conductor 21A between conductors 23A and 23B, which are connected to the "a" and "b" inputs of H-bridge circuit 62.

Figure 3A:
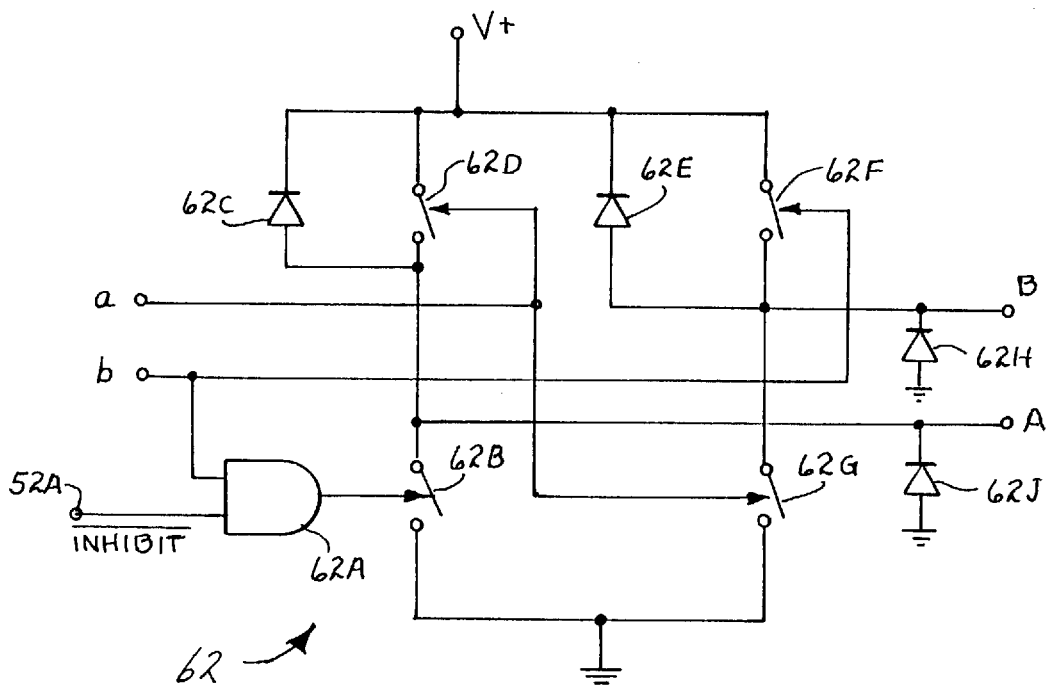
FIG. 3A is a detailed block diagram of the H-bridge circuit shown in FIG. 3.

H-bridge circuit 62 is schematically illustrated in FIG. 3A. The $\overline{\text{INHIBIT}}$ signal on conductor 52A is applied to one input of an AND gate 62A, the other input of which is connected to the "b" input of H-bridge 62. The output of AND gate 62A is connected to the control terminal of switch 62B, which has one current-carrying terminal connected to ground and its other current-carrying terminal connected to the A output of H-bridge circuit 62 and to one current-carrying terminal of a switch 62D and the anode of diode 62C. The cathode of diode 62C is connected to V+. The other current-carrying terminal of switch 62D is connected to V+. The control terminal of switch 62D is connected to the "a" input of H-bridge circuit 62, as is the control terminal of a switch 62G. One terminal of switch 62G is connected to ground and its other current-carrying terminal is connected to the "B" output, one terminal of switch 62F, and the anode of diode 62E. The other terminal of switch 62F is connected to V+. The cathode of diode 62E is connected to V+. The control terminal of switch 62F is connected to the "b" input of H-bridge circuit 62. The A and B outputs of H-bridge circuit 62 are connected to cathodes of diode 62H and 62J, respectively, the anodes of which are connected to ground.

H-bridge circuit 62 operates as follows if the $\overline{\text{INHIBIT}}$ is inactive, i.e., is at a logical "1" so that AND gate 62A is enabled. If the "a" input is at a "1", then the "b" input is at a logical "0" (or vice versa) as indicated by waveforms A and B of FIG. 5). Switches 62D and 62G are closed by the "1" on input "a". Switches 62B and 62F are open because of the "0" on input "a". Closed switch 62D pulls the A output of H-bridge circuit 62 to V+ volts, and closed switch 62G pulls the B output to ground. If the "b" input is at a logical "1" and the "a" input is at a logical "0", this causes switches 62B and 62F to be closed and switches 62D and 62G to be open. Closed switch 62B pulls the A output to ground, and closed switch 62F pulls the "B" output to +V volts.

However, if the $\overline{\text{INHIBIT}}$ signal on conductor 52A is at a "0" level, AND gate 62A is not enabled. Switch 62B therefore remains open regardless of the levels on the "a" and "b" inputs. The phase of the 400 kilohertz signal on conductor 25A and the state of decode circuit 51 are such that during the feedback period the $\overline{\text{INHIBIT}}$ level on conductor 52A is a "0", the "a" input is a "0", and the "b" input is a "1". Then both the A and B outputs of H-bridge circuit 62 are at V+ volts during the feedback period, and the A output will be in a high impedance state to allow an error feedback pulse to be transmitted from secondary winding terminal 45 to primary winding terminal 62A to be sensed by differential amplifier 61. (This result could, of course, be implemented with other, perhaps more complex, circuitry.) The diodes 62C, 62E, 62H, and 62J are shown because they are necessary to limit voltage spikes which would otherwise occur in the presence of sudden interruptions in the flow of current through primary winding 4A as the various switches are abruptly opened and closed.

The output 50A of watch dog circuit 50 is applied as another input to the NOR gate 52. A thermal shutdown circuit 65 also is coupled by NOR gate 52 to the inhibit input of H-bridge 62 to interrupt current pulses supplied to the primary winding 4A of transformer 4 if the temperature of thermal shutdown circuit 65 exceeds a predetermined value. The above mentioned thermal linking of the core of transformer 4 to thermal shutdown circuit 65 is shown by dotted line 70 in FIG. 2.

The input supply voltage V+ is applied to a conventional voltage regulator circuit 26. Voltage regulator 26 is used to power the rest of the circuitry in DC-to-DC converter circuit 1, except H-bridge 52 and input circuitry of the sample and hold circuit 22. (All of the circuitry in secondary circuit 6 is powered by $V_{DCOUT}$.)

Voltage regulator 26 also produces a precisely regulated voltage on conductor 26B which is independent of V+. That regulated reference voltage is applied to one input of comparator 69, the other input of which is connected to receive the ramp waveform on conductor 24A. The fixed reference voltage on conductor 26B causes comparator 69 to produce a minimum (5%) duty cycle PWM signal on conductor 69A, which then is alternatively coupled by means of a "wired OR" connector of conductor 69A to conductor 4A to the "a" and "b" inputs of H-bridge 62 in the event that there is no feedback signal. This ensures that there will be continuous, at least minimum duty cycle, PWM waveforms A and B of FIG. 5 continuously applied to primary winding 4A, except during the one-of-eight feedback periods. Note that if there were no primary current at all, $V_{DCOUT}$ would decrease, a large feedback error voltage would be transmitted back to the primary circuit 3, and there would be a large surge or spike of current, resulting in very poor EMC (electromagnetic conduction). The effect of the resulting high current spikes would be difficult to filter out of V+ as necessary to meet government EMC regulations. This "minimum PWM signal" is applied on conductor 69A to one input of AND gate 64. The output of comparator 63 is applied by conductor 63A to a third input of AND gate 64.

The voltage produced by regulator circuit 26 on conductor 26A is approximately proportional to V+, and causes a pulse width modulated output signal produced on conductor 63A by comparator 63 to have a decreasing duty cycle as V+ increases. That PWM pulse on conductor 63A "overrides" the PWM pulse produced by comparator 21 on conductor 21A, to thereby prevent the output voltage $V_{DCOUT}$ from rapidly changing in response to a large transient value of V+. This avoids the problem of sudden changes in $V_{DCOUT}$ due to V+ transients, wherein the described feedback (which occurs during only one-eighth of the operating time) can not respond quickly enough.

The outputs A and B of H-bridge circuit 62 apply current drive pulses of widths equal to the widths of the PWM pulses on conductor 21A to the primary winding terminals 62A and 62B of transformer 4. The amplitude of current pulses in the primary winding 4A is limited by the inductance of primary winding 4A and hence the loading on the transformer. Switching of the PWM pulses on conductor 31A from input "a" of the bridge 62 to input "b" reverses the polarity of the current pulse produced on outputs A and B.

Primary winding terminals 62A and 62B also are connected to the inputs of a differential amplifier 61 having a gain of 0.15. The output of amplifier 61 is connected to the sample input terminal of sample and hold circuit 22. The output of sample and hold circuit 22 is connected to input of PWM comparator 21. The outputs of comparators 21 and 63 are ANDed and applied to the input terminal of SPDT switch circuit 23. PWM comparator 21 produces a PWM (pulse width modulation) signal on conductor 21A which accurately represents the error voltage sampled in response to the sample signal on conductor 51A from the output of differential amplifier 61 and then held on conductor 22A by sample and hold circuit 22.

The terminals 45 and 46 of the secondary windings 4B and 4C, respectively, are connected to secondary circuit 6. A center tap conductor of secondary windings 4B and 4C also is connected to a secondary ground conductor 47 of secondary circuit 6. Secondary circuit 6 includes a rectifier diode 54 having its anode connected to conductor 45 and its cathode connected to DC output conductor 48. The regulated DC output voltage $V_{DCOUT}$ of DC-to-DC converter 1 is produced on conductor 48, which is connected to a reference input of each of gap detection circuit comparators 66 and 67. The other input of comparator 67 is connected to conductor 45, and the other input of comparator 66 is connected to conductor 46. Conductor 46 also is connected to the anode of rectifier diode 55, the cathode of which is also connected to DC output conductor 48.

Conductor 45 also is connected to one current-carrying terminal of a single pole, double throw switch circuit 53. The control terminal of switch circuit 53 is connected by conductor 68A to the output of a retriggerable monostable or one-shot timer circuit 68, which is part of the gap detection circuit. The trigger input of the retriggerable monostable 68 is connected to the outputs of comparators 66 and 67 and retriggers monostable 68 before it times out during each of the consecutive power periods, until the feedback period occurs wherein no power pulses are produced on the secondary winding output terminals. The second current-carrying terminal of switch circuit 53 is connected by conductor 57A to the output of an error amplifier 57.

Error amplifier circuit 57 has one input connected by conductor 56A to a conventional band gap circuit 56 which produces a nominal voltage of 1.2 volts between secondary ground conductor 47 and conductor 56A. Conductor 56A also is connected to one input of a shunt regulator 58, the other input of which is connected by conductor 64 to the junction 64 between two voltage divider resistors 59 and 60 and to the other input of error amplifier 57. The ratio of voltage divider resistors 59 and 60 is selected to provide any suitable regulated value of $V_{DCOUT}$, for example, 5.0 volts or 3.3 volts. The output of shunt regulator amplifier 58 is connected to DC output conductor 48.

Figure 5:
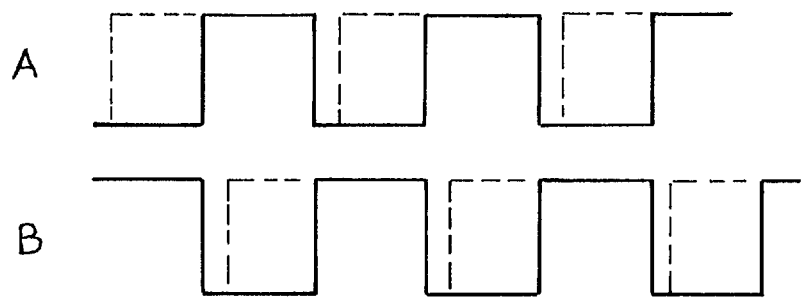
FIG. 5 is a timing diagram of PWM power pulses applied by terminals A and B of an H-bridge circuit to the primary transformer winding shown in FIG. 3.

Referring to FIGS. 3–5, the basic operation of DC-to-DC converter 1 is that it operates in repetitive "cycles", each consisting of seven consecutive "power" periods and one "feedback" period. Such periods occur at a 400 kilohertz rate.

During the seven consecutive power periods of each cycle the primary circuit 3 generates PWM (pulse width modulation) pulses and applies them as the power pulse waveforms A and B of FIG. 5 to primary winding terminals 62A and 62B. This causes transformer 4 to produce corresponding secondary PWM power pulses on secondary winding terminals 45 and 46, respectively. Such secondary PWM power pulses are rectified by diodes 54 and 55 and then filtered to produce the DC output voltage $V_{DCOUT}$ on conductor 48, relative to secondary ground conductor 47. Filtering or smoothing of $V_{DCOUT}$ is accomplished by a load capacitor 71 coupled between conductors 47 and 48 and the leakage conductance of the secondary windings 4B and 4C.

During the above mentioned "feedback" period the above generation of PWM power pulses in primary circuit 3 and secondary circuit 6 is inhibited. The gap detector circuit 66,67,68 detects the absence of the PWM power pulses on secondary winding terminals 45 and 46 and generates the gap detect pulse shown in FIG. 4, and switches the output of error amplifier 57 as a pulse onto secondary winding terminal 45. The error voltage thus is transmitted as an error signal in the reverse direction across transformer 4, i.e., from the secondary circuit 6 to the primary circuit 3 during the feedback period. This feedback error voltage then is amplified, sampled, and used to increase the width of the PWM power pulses during the subsequent seven power periods if the present value of $V_{DCOUT}$ is lower than the desired value.

In operation, oscillator 24 generates the 800 kilohertz ramp waveform 34 in FIG. 4 which is divided by two by circuit 25 to produce the 400 kilohertz square wave on conductor 25A. The signal on conductor 25A operates switch unit 23 to alternately switch the PWM signal on conductor 21A between conductors 23A and 23B, i.e., between the "a" and "b" inputs of H-bridge circuit 62. Comparator 21 produces the PWM pulses 21A by comparing the oscillator ramp signal 34 (FIG. 4) with the feedback error voltage on sample and hold output conductor 22A being applied to the other input of comparator 21 for the seven power periods of the present cycle by sample and hold circuit 22.

The operation of H-bridge circuit 62 is such that during each of the seven power periods of the present cycle, switch 23 applies one pulse of the PWM signal on conductor 21A to the "a" input of H-bridge circuit 62 and then applies the next pulse of the PWM signal on conductor 21A to the "b" input of H-bridge circuit 62. This has the effect of applying one PWM power pulse of one polarity between primary winding terminals 62A and 62B, immediately followed by an identical PWM power pulse of the opposite polarity. This has the subsequently described desirable result of producing a very low average or "standing" current in primary winding 4A.

After seven consecutive power periods have elapsed, one-of-eight decoder 51 produces a "sample" pulse on conductor 51A and an "inhibit" pulse on conductor 51B, to establish the feedback period. The inhibit pulse on conductor 51B is applied to the inhibit input of H-bridge circuit 62 to prevent any current from being applied by the A and B outputs of H-bridge circuit 62 to primary winding terminals 62A and 62B. The "sample" pulse on conductor 51A causes sample and hold circuit to sample the amplified error feedback voltage produced by amplifier 61 and hold that voltage on conductor 22A until the feedback period of the next cycle.

The "gap detect" circuit 66,67,68 signals the absence of any PWM power pulses on either of secondary winding terminals 45 and 46 by failing to retrigger monostable 68, which then produces the gap detect pulse 37 (FIG. 4) on conductor 68A. Gap detect pulse 37 closes switch 53 to thereby switch the error voltage produced on conductor 57A by error amplifier 57 to secondary winding terminal 45 in the form of a feedback error pulse. That feedback error pulse is reproduced between primary winding terminals 62A and 62B, amplified by a gain of 0.15 by amplifier 61, and sampled by sample and hold circuit 22 in response to the sample signal produced on conductor 51A by one-of-eight decode circuit 51. The sampled voltage then is held on conductor 22A and applied as a reference input to PWM comparator 21 during the seven power periods of the next cycle. As $V_{DCOUT}$ is increased from zero toward its desired value, maximum pulse width modulation occurs, until the voltage of conductor 64 exceeds the band gap voltage on conductor 56A. After that, an increased error voltage on conductor 22A decreases the widths of the PWM power pulses (of waveforms A and B in FIG. 5) applied to primary winding 4A during the seven power periods of the next cycle, thereby increasing $V_{DCOUT}$ toward its proper value.

It should be noted that the above system is a closed loop feedback system, and that error amplifier 67 has a sufficiently long time constant to provide adequate compensation.

Shunt regulator 58 has a built-in offset voltage of about 3% of the reference voltage generated by band gap circuit 56. This allows $V_{DCOUT}$ to rise a level corresponding amount higher than the desired value (5.0 volts or 3.3 volts). If $V_{DCOUT}$ exceeds that allowed "overvoltage" level, shunt regulator 58 shunts enough current from conductor 48 to ground to regulate $V_{DCOUT}$ by preventing any further increase thereof.

In DC-to-DC converter 1, the above described operation provides push-pull PWM pulses to the primary winding 4A at twice the fundamental switching frequency. This results in energy transferred across the transformer during each half of each power period, but with zero average primary current and secondary current and hence little or no residual DC flux. Consequently, the maximum flux density is not controlled by the BH saturation characteristic, but instead is controlled by the maximum acceptable core loss (contrary to conventional wisdom). The small toroidal ferrite core shown in FIG. 2A therefore is designed to have a low ratio of volume to surface area, and the actual power loss is determined by the volume of the ferrite toroidal core and the magnetic flux therein. The low volume of the core results in low power loss. Packaging of the small toroidal core as shown in FIG. 2A, surrounded by lead frame elements, results in excellent heat sinking of power dissipated in the core.

The above described DC-to-DC converter provides an economical, well regulated 3 watt DC output voltage source in a standard 24 pin JEDEC package, using only a few individual components. The device produces very low EMC current spikes and therefore avoids the need for filtering to remove them. The "time division" providing error voltage feedback across a single transformer between groups of power pulses to adjust the pulse width modulation as described allows use of a very small magnetic element.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, the feedback data 12,13 can be either amplitude modulated or variable pulse time modulated. The number of "power periods" in each cycle could, of course, be more or less than seven, and the number of "feedback periods" could be more than one. The rectifying diodes could be integrated into the same chip with the rest of secondary circuit 6. The rectifier diodes could be replaced by synchronously operated switches to produce essentially the same rectifying operation.

What is claimed is:

1. In a method of converting a DC source signal to a regulated DC output voltage by generating a first digital signal and applying power pulses across the primary winding of an isolation transformer in response to the first digital signal to produce the DC output voltage and rectifying corresponding power pulses produced across a secondary winding of the isolation transformer, the improvement comprising the steps of:

(a) cyclically dividing the first digital signal into a first number of equal time frames, at least one of the power pulses occurring during each of the time frames, and during each cycle generating a second digital signal during a first one of the first number of time frames, respectively;

(b) inhibiting the power pulses during the first one of the first number of time frames;

(c) producing an error signal representing an error in the DC output voltage;

(d) detecting the absence of corresponding power pulses from the secondary winding to thereby determine the time of occurrence of the first one of the first number of time frames and then transmitting the error signal to the secondary winding to produce a corresponding error signal across the primary winding; and (e) modulating the widths of the power pulses in response to the corresponding error signal during the following cycle to adjust the DC output voltage to reduce the error signal.

2. A method of converting a DC source signal to a regulated DC output voltage, comprising the steps of:

(a) generating a first digital signal;

(b) repeatedly dividing the first digital signal into a first number of equal time frames and generating a second digital signal, during a first one of the first number of time frames, respectively;

(c) producing a pulse width modulated signal in response to the DC source signal, the first digital signal, and an error signal reference voltage representing a difference between the DC output voltage and a desired DC output voltage;

(d) amplifying and applying the pulse width modulated signal across a primary winding of an isolation transformer during all of the first number of equal time frames except the first one thereof;

(e) rectifying a second pulse width modulated signal produced across a secondary winding of the isolation transformer in response to the pulse width modulated signal applied across the primary winding to produce the DC output voltage;

(f) comparing a signal representing the DC output voltage to a reference voltage representing the desired DC output voltage to produce an error signal;

(g) transmitting the error signal across the isolation transformer from the primary winding to the secondary winding during the first one of the first number of time frames; and (h) producing the error signal reference voltage in response to the transmitted error signal during the first one of the first number of time frames.

3. The method of claim 2 wherein the first frequency is approximately 400 kilohertz.

4. The method of claim 3 wherein the first number is 8.

5. The method of claim 2 wherein step (a) includes generating a ramp signal, and step (b) includes generating the first digital signal in response to the ramp signal, and wherein step (c) includes pulse width modulating the DC input signal by comparing the ramp signal to the signal reference voltage.

6. The method of claim 5 wherein step (h) includes detecting the transmitted error signal, sampling the detected transmitted error signal by means of a sample and hold circuit, and storing the sampled detected error signal to provide the error signal reference voltage.

7. The method of claim 2 wherein step (b) includes dividing the first digital signal into the first number of equal time frames and generating the second digital signal during one of the first number of time frames by performing the steps of dividing the first digital signal by a predetermined number by means of a divider circuit and decoding outputs produced by the divider circuit.

8. A converter for converting a DC source signal to a regulated DC output voltage, comprising in combination:

(a) a time division circuit operative to cyclically divide a first digital signal into a first number of equal time frames during each cycle and generate a second digital signal during a first one of the first number of time frames, respectively;

(b) a pulse width modulator operative to produce a pulse width modulated signal in response to the DC source signal, the first digital signal, and an error signal reference voltage representing a difference between the DC output voltage and a desired DC output voltage;

(c) amplifying circuitry responsive to the pulse width modulated signal to produce an amplified pulse width modulated signal across the primary winding of an isolation transformer during all of the first number of equal time frames except the first one thereof;

(d) a rectifying circuit operative to rectify a second pulse width modulated signal produced across a secondary winding of the isolation transformer to produce the DC output voltage;

(e) an error amplifier responsive to the DC output voltage and a reference voltage to produce an error signal; and (f) circuitry to apply the error signal across the secondary winding during the first one of the first number of time frames to produce the error signal reference voltage, the pulse width modulator being operative to adjust the duty cycle of the pulse width modulated signal to reduce the magnitude of error voltage.

9. A converter for converting a DC source signal to a regulated DC output voltage, comprising in combination:

(a) a ramp signal generator generating a ramp signal;

(b) a signal generator circuit coupled to the ramp signal generator and producing a first digital signal in response to the ramp signal;

(c) a time division circuit coupled to the signal generator circuit and operative to repeatedly divide the first digital signal into a first number of equal time frames, and repeatedly generate a second digital signal during a first one of the first number of time frames, respectively;

(d) a pulse width modulator operative to produce a pulse width modulated signal in response to the DC source signal, the first digital signal, and an error signal reference voltage representing a difference between the DC output voltage and a desired DC output voltage;

(e) an isolation transformer having a primary winding and a secondary winding;

(f) amplifying circuitry coupled to the pulse width modulator and operative to amplify and apply the pulse width modulated signal across the primary winding of the isolation transformer during all of the first number of equal time frames except the first one thereof;

(g) a rectifying circuit coupled to the secondary winding and operative to rectify a second pulse width modulated signal produced across a secondary winding of the isolation transformer in response to the pulse width modulated signal applied across the primary winding to produce the DC output voltage;

(h) a comparison circuit coupled to the DC output voltage and operative to compare a signal representative of the DC output voltage to a reference voltage to produce an error signal;

(i) switching circuitry coupled to the comparison circuit and operative to transmit the error signal across the isolation transformer from the secondary winding to the primary winding during the first one of the first number of time frames; and (j) a sample and hold circuit coupled to the primary winding and operative to sample the error signal transmitted across the isolation transformer during the first one of the first number of time frames and then hold the sampled error signal to provide the error signal reference voltage, the pulse width modulator being operative to reduce the duty cycle of the pulse width modulated signal to reduce the magnitude of error voltage.

10. The converter of claim 9 wherein the ramp signal generator includes an oscillator.

11. The converter of claim 10 wherein the time division circuit includes a counting circuit coupled to receive the first digital signal as an input and a decoding circuit coupled to the counting circuit to decode a state of the counting circuit which corresponds to the first one of the first number of time frames.

12. The converter of claim 9 wherein the transformer includes two secondary windings coupled in series and having a common tap conductor therebetween, the tap conductor functioning as a secondary circuit ground conductor.

13. The converter of claim 12 wherein the rectifying circuit includes a first diode having an anode coupled to a first terminal of the secondary winding and a cathode coupled to an output conductor providing the DC output voltage, and a second diode having an anode coupled to a second terminal of the secondary winding and a cathode coupled to the output conductor.

14. The converter of claim 13 wherein the amplifying circuitry includes an H-bridge circuit 62 having a power input receiving the DC source signal and having an inhibit input coupled to receive the second digital signal as an inhibit signal, first and second inputs alternatingly receiving pulses of the pulse width modulated signal, and first and second outputs alternatingly applying the DC source signal to the first and second terminals of the primary winding, respectively, to thereby minimize standing current in the transformer.

15. The converter of claim 14 including a single pole, double throw circuit having a switching control input coupled to receive the first digital signal, a single pole input coupled to receive the pulse width modulated signal, and first and second outputs between which the pulse width modulated signal is alternatingly switched in response to the first digital signal, the first and second outputs of the single pole, double throw switch circuit being coupled, respectively, to the first and second inputs of the H-bridge circuit.

16. The converter of claim 9 wherein the pulse width modulator includes a first comparator having a first input coupled to receive the error signal reference voltage and a second input coupled to receive the ramp signal.

17. The converter of claim 16 wherein the pulse width modulator includes a second comparator having a first input coupled to receive the ramp signal and a second input coupled to receive a fixed reference voltage which is lower in amplitude than any peak value of the ramp signal to produce a minimum pulse width modulated signal which is logically ORed with an output of the first comparator to ensure continuous application of power pulses to the primary winding irrespective of the value of the DC output voltage.

18. The converter of claim 16 wherein the pulse width modulator includes a second comparator having a first input coupled to receive the ramp signal and a second input coupled to receive a variable threshold which increases and decreases along with the DC source signal, to produce a pulse width modulated output signal the duty cycle of which varies inversely with respect to the magnitude of the DC source signal, the modulated output signal produced by the second comparator being logically ANDed with the pulse width modulated signal produced by the first comparator.

19. The converter of claim 9 wherein the first number is 8.

20. The converter of claim 9 including gap detector circuitry coupled to first and second terminals of the secondary winding for B,C and operative to detect an absence of power pulses on the first and second terminals of the secondary winding during the first one of the first number of time frames, the gap detector circuitry applying a control signal during the first one of the first number of time frames to the switching circuitry to enable it to transmit the error signal.

21. The converter of claim 20 wherein the gap detector circuitry includes first and second comparators each having a first input coupled to the DC output voltage, a second input of the first comparator of the gap detector circuitry being coupled to the first terminal of the secondary winding, a second input of the second comparator of the gap detector circuitry being coupled to the second terminal of the secondary winding, outputs of the first and second comparators of the gap detector circuitry being coupled to an input of a retriggerable monostable to retrigger it in response to an edge of any power pulse on either of the first and second terminals of the secondary winding to prevent the monostable from timing out and producing the control signal until a next first one of the first number of time frames occurs.

22. A converter for converting a DC source signal to a regulated DC output voltage, comprising in combination:
(a) a dual-in-line package;
(b) a thin toroidal transformer having wound on one side thereof a primary winding and on an opposite thereof, a secondary winding, the toroidal transformer being located in a center portion of the package;
(c) a plurality of co-planar primary side lead frame members disposed in the package adjacent to the primary winding, first and second terminals of the primary winding being electrically connected to first and second primary side lead frame members, respectively;
(d) a plurality of co-planar secondary side lead frame members disposed in the package adjacent to the secondary winding, first and second terminals of the secondary winding being electrically connected to first and second secondary side lead frame members, respectively;
(e) a primary controller integrated circuit chip attached to a third primary side lead frame member and electrically coupled to the DC source signal and the first and second primary side lead frame members;
(f) a secondary controller integrated circuit chip attached to a third secondary side lead frame member and electrically coupled to the first and second secondary side lead frame members; and
(g) the first and second primary lead frame members and the first and second secondary side lead frame members being spaced from and shaped to partially surround the toroidal transformer to thermally spread heat dissipated in the toroidal transformer throughout the package to promote efficient power dissipation through leads of the package.

\* \* \* \* \*